March 28, 1967     J. G. GUTSHALL     3,311,188
AUTOMATIC OPENING SEAT BELT FASTENER
Filed Aug. 19, 1965
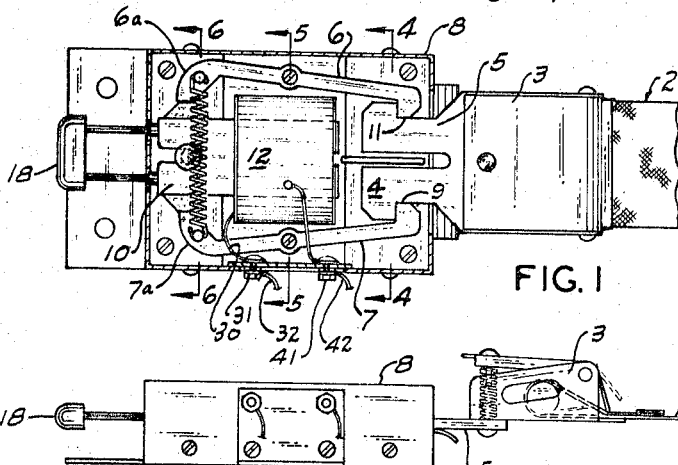
FIG. 1
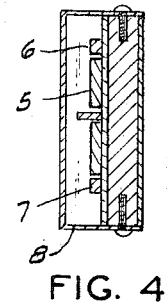
FIG. 4
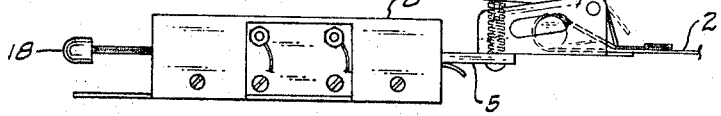
FIG. 2
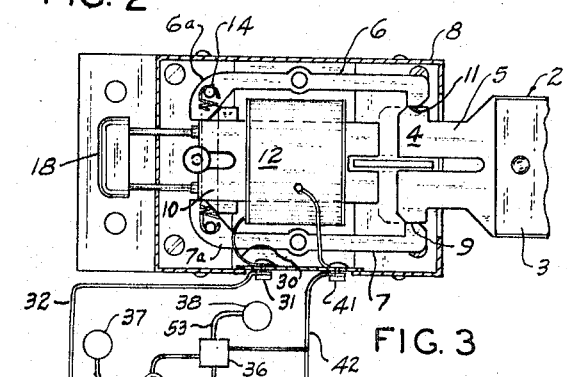
FIG. 3
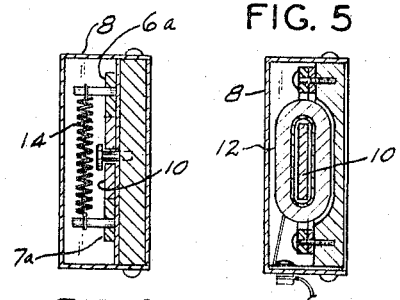
FIG. 5
FIG. 6
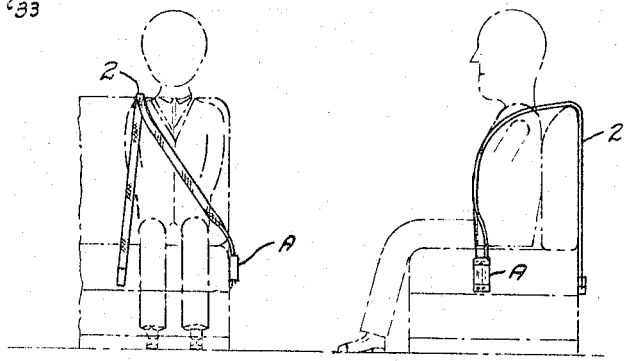
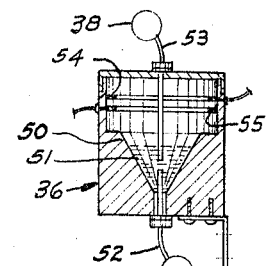
FIG. 9
FIG. 7     FIG. 8
INVENTOR.
JAMES G. GUTSHALL
BY Scott L. Norvick
atty ns Patent Office
3,311,188
Patented Mar. 28, 1967

1

3,311,188
AUTOMATIC OPENING SEAT BELT FASTENER
James G. Gutshall, 103 W. Marshall Ave.,
Phoenix, Ariz. 85013
Filed Aug. 19, 1965, Ser. No. 481,152
3 Claims. (Cl. 180—82)

This invention pertains to seat belts of the type used in vehicles to keep passengers from being hurt by striking portions of the interior of the vehicle due to inertia following a collision.

One of the objects of the invention is to provide a seat belt latch or fastener which will connect and end of the belt with the frame on which the seat rests.

Another object is to provide a mechanism which will disconnect the seat belt fastening when desired either by electrical means or manual means.

Still another object is to provide means for disconnecting the seat belt when the vehicle is tipped or tilted as in an upset accident.

A further object is to provide several means for disconnecting the belt with manual or by mechanical automatic means after an accident so that the occupant or occupants of the car will not be trapped in the seat.

I attain the foregoing objects by means of the devices, parts and combination of parts shown in the accompanying drawings in which;

FIGURE 1 is a plan view of the seat belt buckle fastener incorporating my improvents;

FIGURE 2 is an edge view drawn in top plan of the device shown in FIGURE 1;

FIGURE 3 is a view of the belt fastener, shown in FIGURE 1, but with portions of the case broken away to show the interior and with the interlocking parts in unlatched or releasing position;

FIGURE 4 is a section taken on line 4—4 of FIGURE 1;

FIGURE 5 is a section taken on line 5—5 of FIGURE 1;

FIGURE 6 is a section taken on line 6—6 of FIGURE 1;

FIGURE 7 is a semi-diagrammatic view of the device as applied to an automobile seat;

FIGURE 8 is a side view of the device shown in FIGURE 7 and;

FIGURE 9 is the suggested device to be used in releasing the latching mechanism in case of upset of the automobile.

Similar numerals refer to similar parts in the several views.

The seat belt 2 includes a strap which goes across the front of the body of the occupant of the car rather than only around his waist. Belts having buckles have been known to cause internal injury to the passenger when the belts are applied to the waist only in case of an accident or upset. The ends of the strap or belt 2 are removably attached by latch mechanism to the sides of the seat. At least one of the latching attachments is operated by a remote control as well as by levers on the latch mechanism.

The portion of the strap or belt 2 that goes over the shoulder of the occupant is attached permanently to the back of the seat near the bottom of the seat or to the floor below the back of the seat. The latching mechanism is disposed at the other end of the strap and operates between the strap and the bottom frame of the seat. This structure is marked A.

This latching mechanism includes a double hooked tongue 5 at one end that engages a pair of pivotally supported hooks 6 and 7 all disposed within case 8.

The hooks 6 and 7 are made of flat metal and engage the ears 8 and 9 on the tongue portion 4 which is attached to the seat belt strap portion 3.

Hooks 6 and 7 engage ears 8 and 9 in the inner end of hook 5 and at the opposite ends are shaped to contact portions of the armature 10 of solenoid 12. This contact has a wedging action which forces hooks 6 and 7 into engagement with belt buckle ears 8 and 9 as shown in FIGURE 1.

A spring 14 urges the inner ends of hook levers 6A and 7A normally out of engagement with the belt buckle tongue 5.

Electrically energizing solenoid 12 retracts armature 10 and tends to release hook levers 6A and 7A from locking engagement with a belt hook 5.

A manual release 18 operates to have the same effect. This release is attached to armature 10 and will slidably move it to operate the same as the solenoid 12. After the belt is placed over the shoulder of the user as shown in FIGURES 7 and 8, it will stay in place because spring 14 holds hooks 6 and 7 in engaging position. The user may then release the belt either by operating lever 18 or by closing the circuit through the solenoid by means of a push button 20 placed in any convenient position on the dash.

With reference to the semi-diagrammatic FIGURE 3, the inner terminal 30 of the winding of solenoid 12 is connected to bolt 31 on the case 8 to which the bolt 31 connects to conductor 32 and to battery 33. The opposite terminal is connected to conductor 34 which also connects to distributor mercury switch 36, which is connected to coil 37 and distributor 38.

A jumper conductor 40 leads through button switch 20 on the automobile dash, returns through conductor 42 to bolt 41 and the outside terminal of coil 12.

The mercury switch 36 has a conical well 50 which holds a pool of mercury 51, normally connecting to inner ends of the coil conductor wire 52 and the distributor wire 53. Above the pool and normally out of contact with it are conductor rings 54 and 55 which are positioned to be mutually contacted in case the automobile is left pitched at an angle of 90° after an accident. The circuit is thus closed and will energize coil 12 if the contact such as switch 20 is closed when it is desired to loosen the belt following a collision. When the mercury contacts both ring terminals 54 and 55 a circuit is formed which activates solenoid 12 and releases the tongue 5.

From the foregoing, it is to be understood that the mercury switch, as above described, is used to disconnect the mechanism of the car in case of an accident in which the car is left at an angle and the engine is still running.

On the other hand, the mercury, in case the car is badly tilted, will close the necessary circuits and permit the belt to be released electrically by the use of switch 20 on the dash. This prevents occupants from being trapped in the car and being held by the belt.

I claim:
1. A safety belt for vehicles comprising a belt strap adapted to extend over the shoulder of a passenger and fasten at one end to the upper part of the seat and having a notched tongue at tthe other end, a buckle latch to receive said tongue comprising a case with a slot to receive the tongue, hooks pivotally supported in said case to engage the notches on said tongue, means in said case for resiliently holding said hooks in engagement with the notches on said tongue, means for slideably releasing said hooks from said notches, a solenoid coil in said case having an armature slideably operative in said solenoid, projections on said armature to engage said hooks and release them from said notches when said armature is slid lengthwise, manual means for sliding said armature lengthwise, means for engaging said sole- noid to give said armature longitudinal movement and release said hooks; switch means for closing an electrical circuit through said solenoid and opening said circuit when said car is upset by an accident.

2. The device described in claim 1 wherein the electrical circuit includes the mercury switch adapted to open the solenoid switch when said car is upset and close said circuit when said upset is more than a predetermined degree.

3. An automatically releasing safety belt buckle comprising a strap adapted to extend over portions of the body of an occupant of an automobile, a body base adapted to attach to the bottom portion of the seat of said automobile and adapted to attach to said strap, a tongue on said strap having hooks adapted to enter said case and engage hooks within said case, said case hooks being pivotally mounted in said case and having wedging mechanism on said hooks to engage an armature, means to force said hooks into engagement with notch hooks on said tongue; said armature being engageable and releasable by activating the solenoid on said case, releasing mechanism on said armature being in operation when said tongue is moved into said case, a handle protruding from said case to manually slide said armature to engage and disengage said hooks from said tongue, electrical circuits to energize said solenoid and release said tongue, said switch including a mercury well in its body disposed to normally close the circuit including the ignition mechanism of said automobile and to open the circuit in case of an upset of said automobile in which the automobile is left in a tilted position; said mercury being disposed to reclose the circuit through the battery of said automobile in case the upset leaves the automobile tilted greater than a predetermined angle.

References Cited by the Examiner

UNITED STATES PATENTS

| | | | |
|---|---|---|---|
| 2,655,579 | 10/1953 | Burroughs | 200—61.52 X |
| 3,134,154 | 5/1964 | Smith et al. | 24—230 |
| 3,146,846 | 9/1964 | Gutshall | 180—82 |
| 3,166,146 | 1/1965 | Shaw | 180—82 |

KENNETH H. BETTS, *Primary Examiner.*